P. T. ELTING.
Bran Duster.
No. 77,965.
2 Sheets—Sheet 1.
Patented May 19, 1868.
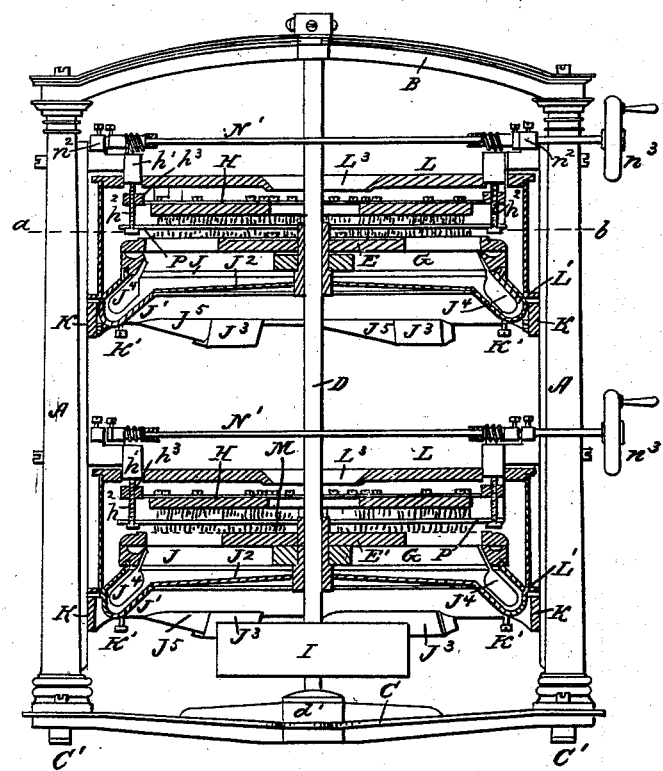

P. T. ELTING.
Bran Duster.
No. 77,965.
2 Sheets—Sheet 2.
Patented May 19, 1868.
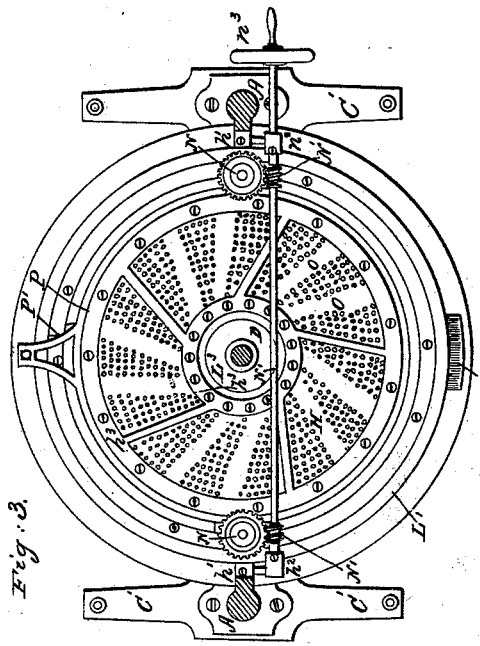
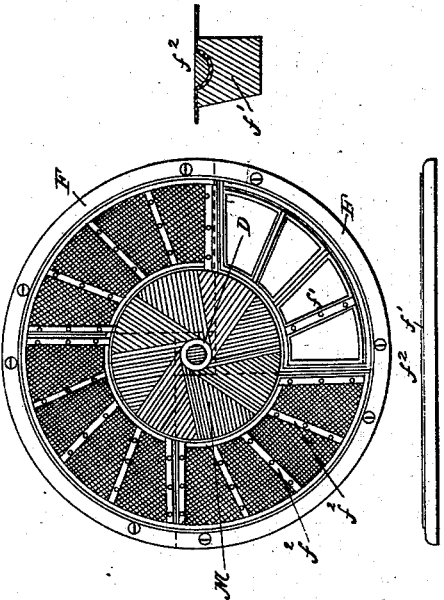
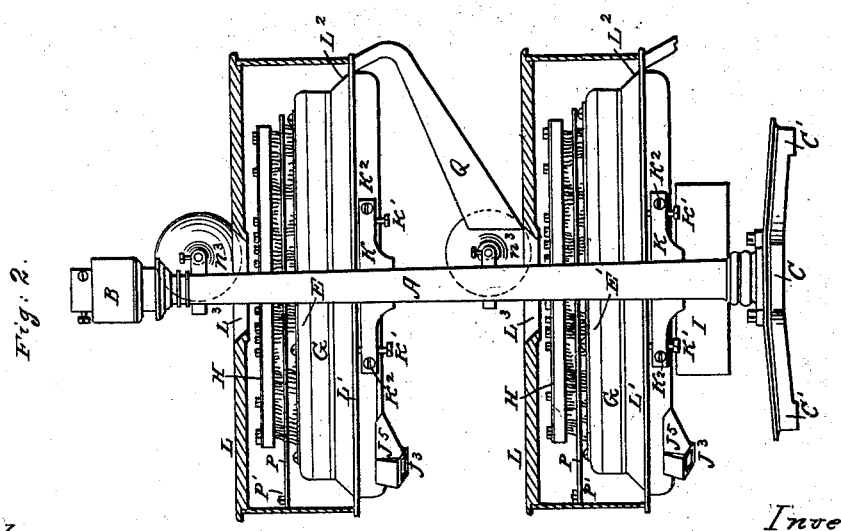
Witnesses:
W. H. Forbush,
Edw. Wilhelm
Inventor:
Peter T. Elting

United States Patent Office.

PETER T. ELTING, OF BUFFALO, NEW YORK, ASSIGNOR TO ELTING BOLT AND DUSTER COMPANY, OF CINCINNATI, OHIO.

*Letters Patent No. 77,965, dated May 19, 1868.*

IMPROVED BRAN-DUSTER.

*The Schedule referred to in these Letters Patent and making part of the same.*

TO ALL WHOM IT MAY CONCERN:

Be it known that I, PETER T. ELTING, of the city of Buffalo, county of Erie, and State of New York, assignor to the Elting Bolt and Duster Company, of the city of Cincinnati, and State of Ohio, incorporated under the laws of the State of Ohio, have invented new and useful Improvements in Bran-Dusters; and I do hereby declare that the following is a full and exact description thereof, reference being had to the accompanying drawings, making a part of this specification, in which—

Figure I is a vertical section.

Figure II is a sectional elevation at right angles to Fig. I.

Figure III is a transverse section on line *a–b* of Fig. I.

Figure IV is a plan of the screen-disk and central scouring-plate.

Letters of like name and kind refer to like parts in each of the figures.

It is well understood that bran-dusting machines have for their object the separation, from the bran of ground wheat, of the fine particles of flour which adhere thereto in grinding, and that this object is attained by forcing the particles of flour through the meshes of a screen or bolt through which the bran cannot pass. In some machines the screen or bolt is made in the form of a disk, and rotated at a high velocity, with its axis vertical, its surface running in contact with stationary brushes which scour the bran and release the flour so that it may pass through the meshes of the screen, when aided by a proper air-current, while the bran is discharged by centrifugal action at the periphery of the screen.

It is to this class of machines that my improvements relate; said improvements consisting—

First, in extending the fan-wings, which produce the air-current through the screen, outwardly and downwardly, beyond the periphery of the screen, to prevent the flour from flying back against the screen, or blowing out at the joint between the screen and flour-chamber, and from packing or clogging in the flour-chamber.

Second, in providing a serrated scouring-plate at the eye of the screen-disk, in order to the more effectually scour the bran where the motion of the disk is slow, and relieve the screen from such labor, so that it may the better perform its proper duty of separation.

Third, making the screen-frame in sections, and covering each section separately with screen-cloth, so that each section may be removed and cleaned or repaired, as occasion may require, without the displacement or removal of any other part.

Fourth, supporting the brush-tempering frame, at two points, by the brush-adjusting screws, and at a third point by a screw-post from the case forming the flour-chamber.

Fifth, supporting the annular case forming the flour-chamber by brackets, (projecting from the vertical posts or main frame of the machine,) and furnished with a double set of adjusting-screws, whereby said case may be adjusted laterally and vertically to secure a close-fitting joint between the case and screen-disk.

Having reference to the accompanying drawings—

The main frame of the machine consists of two vertical posts or columns, A, connected at the top by the bridge-tree B, and connected and supported at the bottom by the bridge-tree C, having lateral extensions, C', at each end, forming feet, upon which the machine stands, with sufficient spread to give it lateral stability.

A vertical shaft, D, located centrally between the columns A, and supported at its lower end by a footstep-bearing, *d'*, in the lower bridge-tree C, and at its upper end by the bridge-tree B, carries the horizontal screen-disks E and E', through which the separation of the flour from the bran is effected.

These disks with all their attendant parts are duplicates of each other, both in construction and operation, and each possesses all the functions of a complete machine. They are used in combination, the offal from the upper one feeding the lower one, thereby securing a more perfect separation of the flour and bran than could be obtained by one alone. More than two might be employed if necessary. The description of construction will be confined to one, although the same letters of reference will be applied to both.

The screen-disk is made of fine wire bolting-cloth, stretched over sectional wooden frames F, which lie upon and are bolted to an open cast-iron wheel, G, keyed upon the vertical shaft D. The arms and rims of the sectional screen-frames have grooves, $f^1$, cut therein, (see Fig. IV,) said grooves being either half round, triangular, or rectangular, and the cloth is secured to the frame by binding-strips of iron $f^2$, (of a cross-section corresponding to the form of groove used,) screwed to the frame, and setting the cloth down into the grooves, thereby securing a perfect tension of, and smooth, even surface to the cloth.

The object of making the cloth-frame in sections is to permit its easy removal from the machine for cleaning and repairs, and also for the greater ease and facility with which the cloth may be applied thereto in the first instance.

It is evident that two sections will accomplish the object, but more may be used, and four are recommended.

The arms of the wheel G are given a fan-rake or pitch, (that is inclined to radii passing through their ends,) and are also bevelled upon their leading edge, so that they act as a fan drawing air through the screen-cloth and throwing it outwardly.

H is a brush-head, supported above the screen-disk, from brackets $h^1$, (projecting inward from the columns A,) by adjusting-screws $h^2$. The brush-head is a flat disk of wood, set with bristles in a common manner, and bolted to a light frame of iron, $h^3$, to give it strength and prevent its warping; said frame having ears, with screw-threads cut therein, through which the adjusting-screws work. Its diameter is equal to (or nearly so) that of the screen-disk, and a large eye is formed at its centre through which the bran is fed to the screen-disk.

The screen-disk is caused to revolve at a high rate of speed by power applied to the pulley I on the shaft D, and the brushes are brought into contact therewith by the proper adjustment of the screws $h^2$, so that the bran received upon the screen-disk at its centre, and distributed over its surface by centrifugal force, is brought under the action of the brushes, which separate the fine adhering particles of flour therefrom, and force them through the meshes of the screen, while the bran, which from its greater bulk will not pass through the meshes of the screen, continues its centrifugal course, and is discharged from the periphery of the disk.

The flour, as it falls through the meshes of the screen, is received into a chamber, J, which extends downwardly and outwardly beyond the periphery of the screen-disk. This downward and outward extension of the chamber is formed by a light cast-iron annular case, $J^1$, while the bottom proper of the chamber is formed by slightly crowning plate, $J^2$, of wood or sheet metal secured to said case $J^1$. One or more orifices, $J^3$, are made through the bottom of the case $J^1$ for the discharge of the flour.

Fan-wings, $J^4$, are attached to the rim of the screen-wheel G, and project into the downward and outward extension of chamber J, and by their action assist the fan-arms of the wheel G in creating a downward current of air through the screen, and an outward current from chamber J, by which the flour is collected in the annular extension of chamber J, from which it is discharged through the orifices $J^3$, the wings $J^4$ acting as scrapers, and carrying the flour around to said orifices. An inclined approach, $J^5$, to the orifices is made in the bottom of case $J^1$, preventing the wings from carrying the flour past said orifice, and so insuring its free escape therefrom.

The screen-wheel G is made to run in as close contact as possible with the upper edge of the case $J^1$, so as to prevent a leakage of flour through the joint. A groove may be turned in the under side of the screen-wheel rim to fit a corresponding tongue on the upper side of case $J^1$, thereby rendering the joint still less liable to leak flour. But the extension of the chamber J beyond the periphery of the screen fully secures the joint from leakage by preventing any reactive current of air. The case $J^1$ is supported by the brackets K, bolted to the columns A, said brackets having set-screws $K^1$ at each end for the vertical adjustment of the case, and also set-screws $K^2$ for the lateral adjustment thereof, by means of which compound adjustability a good joint, between the screen-wheel G and case $J^1$ may be always readily obtained.

The screen-disk and brush-head are covered by a curb, L, resting upon a flange, $L^1$, projecting around the case $J^1$. This curb prevents the escape of the bran, except through the orifice $L^2$ made through the flange $L^1$ for its escape. A large eye, $L^3$, equal in size to that through the brush-head, is made through the top of the curb for the feeding in of the bran. The curb is made in two halves, so that it may be readily removed when it is desired to get at the screen or brush-head.

Small wings may be attached to the periphery of the screen-wheel to scrape the bran or offal around to the discharge-orifice; but they are hardly necessary, since the curb would never fill up to the level of the screen-surface.

A serrated metal plate, M, is applied to the centre of the screen-wheel, and extended a short distance under the brushes. This plate, owing to its comparatively slow motion, will thoroughly scour the bran before it passes on to the screen-cloth, and thereby greatly relieve the labor and wear and tear of the cloth.

The adjusting-screws $h^2$, by which the brush-head is raised or lowered to regulate the degree of its pressure upon the screen-disk, are operated simultaneously as follows:

Worm-wheels N are keyed to the upper ends of the screws, above their supporting brackets, and a worm-shaft, $N'$, is extended across the machine and engages both worm-wheels, the worm-shaft being supported by brackets, $n^2$, projecting at right angles from brackets $h^1$, and carrying at one end a hand-wheel, $n^3$, by which it may be rotated. By this means the brush-head may be raised and lowered, and its parallel position to the screen-disk always maintained. The brush-head is divided into sectors, leaving narrow parallel spaces between, as shown at O, Fig. III, forming leading-furrows through which the bran may escape in due time to the periphery of the screen-disk, and be discharged therefrom.

These furrows also allow of the introduction of a brush-tempering wheel, P, which is a light iron wheel having its arms corresponding to the furrows, so that it may be inserted between the brush-head and screen-disk, and by raising or lowering it increase or diminish the stiffness of the brushes. This tempering-wheel is supported at two points by the brush-head adjusting-screws which are extended downward for that purpose, and provided with nuts by which the tempering-wheel may be raised or lowered. A third support is afforded by a screw-post, from the case $J^1$, taking hold of a projected ear, $p'$, and also provided with adjusting-nuts so that the wheel is retained securely in position.

A spout, Q, leads from the bran-discharge orifice $L^2$, of the upper screen or bolt, to the eye of the curb of the lower screen, so that the bran discharged from the upper screen is subjected to a second operation, which can hardly fail to remove all remaining particles of flour adhering thereto. The flour-discharge orifices of the upper and lower screens may be brought together into one spout, or may discharge into two different receptacles. A better grade of flour is of course obtained from the upper screen than from the lower one, so that it is generally an object to use different receptacles.

This machine performs its work in the most perfect and satisfactory manner, giving a maximum yield of flour from the bran, and being durable, light-running, and all its parts easily accessible and readily adjusted to the grade of work desired to be done.

Having thus described my invention, what I claim, and desire to secure by Letters Patent, is—

1. The fan-wings $J^4$, revolving within the chamber J, and extending downwardly and outwardly beyond the periphery of the screen-disk, as and for the purpose set forth.

2. The combination of the serrated scouring-plate, at the eye of the screen-disk, with the surrounding screen-cloth, as and for the purpose set forth.

3. Making the screen-frames in sections, as and for the purpose set forth.

4. Supporting the brush-tempering wheel at two points by the brush-adjusting screws, and at a third point by the screw-post from the flour-chamber, for the purpose described.

5. The brackets K, with their adjusting-screws $K^1$ $K^2$, for adjusting the flour-case laterally and vertically, as set forth.

PETER T. ELTING.

Witnesses:
W. H. FORBUSH,
EDW. WILHELM.